United States Patent
Kawamoto et al.

(10) Patent No.: US 12,441,656 B2
(45) Date of Patent: Oct. 14, 2025

(54) GLASS ARTICLE

(71) Applicant: AGC Inc., Tokyo (JP)

(72) Inventors: Yasushi Kawamoto, Tokyo (JP);
Hideyuki Hirakoso, Tokyo (JP);
Hiroshi Yamakawa, Tokyo (JP)

(73) Assignee: AGC INC., Tokyo (JP)

( * ) Notice: Subject to any disclaimer, the term of this patent is extended or adjusted under 35 U.S.C. 154(b) by 307 days.

(21) Appl. No.: 18/117,114

(22) Filed: Mar. 3, 2023

(65) Prior Publication Data

US 2023/0219842 A1 Jul. 13, 2023

Related U.S. Application Data

(63) Continuation of application No. PCT/JP2021/030404, filed on Aug. 19, 2021.

(30) Foreign Application Priority Data

Sep. 4, 2020 (JP) ................. 2020-149056

(51) Int. Cl.
*C03C 17/34* (2006.01)
*C03C 17/00* (2006.01)
(Continued)

(52) U.S. Cl.
CPC ........ *C03C 17/3417* (2013.01); *C03C 17/007* (2013.01); *C03C 17/02* (2013.01);
(Continued)

(58) Field of Classification Search
CPC .... C03C 2217/94–948; C03C 17/3417; C03C 17/3441; C03C 17/007; C03C 17/02;
(Continued)

(56) References Cited

U.S. PATENT DOCUMENTS 5,714,420 A * 2/1998 Sakoske ................. C03C 17/04
427/508
6,174,599 B1 * 1/2001 Boire ................. C03C 17/3441
428/432

(Continued)

FOREIGN PATENT DOCUMENTS

CN    109983839 A    7/2019
EP    3 169 735 A1    5/2017
(Continued)

OTHER PUBLICATIONS

Machine translation of JP 2005/029463 A.*

(Continued)

*Primary Examiner* — Z. Jim Yang
(74) *Attorney, Agent, or Firm* — Foley & Lardner LLP

(57) ABSTRACT

A glass article having an excellent heat resistance, capable of preventing any of layers disposed on a glass substrate from peeling off or being clacked even after a long period of time has elapsed after the bending thereof at a high temperature is provided. A glass article according to the present invention includes, on a glass substrate, a carbon-added silicon oxide layer, a transparent conductive oxide layer, and a shielding layer in this order, in which an atomic-composition percentage ratio C/Si of carbon to silicon in the carbon-added silicon oxide layer is 0.1 or more and 0.5 or less, and a linear expansion coefficient $\alpha_{Sh}$ of the shielding layer is $7.7 \times 10^{-3}$/K or less.

21 Claims, 2 Drawing Sheets

(51) Int. Cl.
*C03C 17/02* (2006.01)
*B32B 17/10* (2006.01)

(52) U.S. Cl.
CPC ..... *C03C 17/3441* (2013.01); *B32B 17/10211* (2013.01); *B32B 17/10348* (2013.01); *C03C 2217/24* (2013.01); *C03C 2217/94* (2013.01)

(58) Field of Classification Search
CPC ..... C03C 17/04; C03C 17/23; C03C 8/14–20; G02B 1/116; B32B 17/10348
See application file for complete search history.

(56) References Cited

U.S. PATENT DOCUMENTS

| | | | | |
|---|---|---|---|---|
| 6,255,239 | B1* | 7/2001 | Sakoske | C03C 17/04 |
| | | | | 428/428 |
| 2007/0029186 | A1* | 2/2007 | Krasnov | C03C 17/3423 |
| | | | | 204/192.29 |
| 2008/0063876 | A1* | 3/2008 | Sakoske | C03C 8/04 |
| | | | | 428/432 |
| 2014/0349107 | A1* | 11/2014 | Thoumazet | C23C 16/325 |
| | | | | 204/192.15 |
| 2016/0016847 | A1 | 1/2016 | Radtke | |
| 2016/0185657 | A1* | 6/2016 | Sakoske | C03C 8/20 |
| | | | | 428/428 |
| 2017/0361576 | A1* | 12/2017 | Legrand | B32B 17/10788 |
| 2018/0194674 | A1* | 7/2018 | Cosijns | C03C 17/3441 |
| 2021/0198119 | A1* | 7/2021 | Sakoske | C01G 49/0072 |

FOREIGN PATENT DOCUMENTS

| | | | |
|---|---|---|---|
| JP | 2005029463 A | * | 2/2005 |
| JP | 2019-509959 A | | 4/2019 |
| JP | 2019-533630 A | | 11/2019 |
| WO | WO-2017/047366 A1 | | 3/2017 |
| WO | WO-2017/127788 A1 | | 7/2017 |
| WO | WO-2018/073567 A1 | | 4/2018 |
| WO | WO-2019/016176 A1 | | 1/2019 |

OTHER PUBLICATIONS

International Searching Authority, "International Search Report," issued in connection with International Patent Application No. PCT/JP2021/030404, dated Nov. 9, 2021.

International Searching Authority, "Written Opinion," issued in connection with International Patent Application No. PCT/JP2021/030404, dated Nov. 9, 2021.

* cited by examiner

GLASS ARTICLE

INCORPORATION BY REFERENCE

This application is based upon and claims the benefit of priority from Japanese Patent Application 2020-149056 filed on Sep. 4, 2020, and PCT application No. PCT/JP2021/030404 filed on Aug. 19, 2021, the disclosure of which is incorporated herein in its entirety by reference.

BACKGROUND

The present disclosure relates to a glass article, in particular, a glass article for vehicle.

In glass articles, such as window glasses in vehicles and buildings, the surfaces of their glass substrates are coated with various materials so that desired properties are given to them according to their purposes.

Patent Literature 1 (Published Japanese Translation of PCT International Publication for Patent Application, No. 2019-533630) discloses a glass article for vehicle in which a base layer, a transparent conductive oxide layer, and a peripheral occultation band with a black pigment or the like added therein (i.e., a shielding layer) are disposed on a glass substrate.

In general, the base layer (e.g., an $SnO_2$ layer) formed on the glass substrate can function as an alkali diffusion prevention layer for preventing alkali metal ions such as sodium ions from migrating from the glass substrate to a layer on the surface side. Further, it is also known that a carbon-added silicon oxide layer (hereafter also referred to as an "SiOC layer") having an excellent alkali diffusion prevention function is used as a base layer instead of using a conventional base layer such as an $SnO_2$ layer.

The transparent conductive oxide layer (e.g., a doped tin oxide layer) is known to have a Low-E (Low Emissivity) property by which the radiant heat of sunlight can be reduced, and hence can improve a thermal insulation property and a heat shielding property of a glass article.

Further, in general, the shielding layer is provided on the periphery of a glass article for vehicle (e.g., a window glass for vehicle), and is provided, for example, to prevent an adhesive from deteriorating due to sunlight and to improve the design of the glass article.

SUMMARY

When a glass article having a structure shown in Patent Literature 1 is bent at a high temperature (e.g., 600° C. or higher) according to the desired purpose, each layer (e.g., each of the base layer and the shielding layer) disposed on the glass substrate may peel off or be cracked. Further, in some cases, even when such phenomena were not observed immediately after the bending of the glass article at the high temperature, they occurred after a certain period of time had elapsed.

The present disclosure has been made in order to solve the above-described problem, and an object thereof is to provide a glass article having an excellent heat resistance, capable of preventing any of layers disposed (e.g., stacked) on a glass substrate from peeling off or being clacked even after a long period of time has elapsed after the bending thereof at a high temperature.

The present disclosure provides glass articles having structures specified by the below-shown Items [1] to [9].

[1] A glass article comprising, on a glass substrate, a carbon-added silicon oxide layer, a transparent conductive oxide layer, and a shielding layer in this order, wherein an atomic-composition percentage ratio C/Si of carbon to silicon in the carbon-added silicon oxide layer is 0.1 or more and 0.5 or less, and a linear expansion coefficient $\alpha_{Sh}$ of the shielding layer is $7.7 \times 10^{-3}$/K or less.

[2] The glass article described in the Item [1], wherein the shielding layer contains a crystalline component and a pigment, and a crystallinity value expressed by a CPS ratio of the crystalline component to the pigment in X-ray diffraction measurement data of the shielding layer is 7 or more and 33 or less.

[3] The glass article described in the Item [1] or [2], wherein the shielding layer contains a crystalline component and a pigment, and a ratio of the ratio C/Si of the carbon-added silicon oxide layer, to a crystallinity value expressed by a CPS ratio of the crystalline component to the pigment in X-ray diffraction measurement data of the shielding layer is 0.005 or more and 0.04 or less.

[4] The glass article described in any one of the Items [1] to [3], wherein a linear expansion coefficient $\alpha_{Si}$ of the carbon-added silicon oxide layer is $0.6 \times 10^{-6}$/K or more and $4.0 \times 10^{-6}$/K or less.

[5] The glass article described in the Item [4], wherein the linear expansion coefficient $\alpha_{Si}$ of the carbon-added silicon oxide layer is $2.9 \times 10^{-6}$/K or less.

[6] The glass article described in any one of the Items [1] to [5], wherein a thickness $t_g$ of the glass substrate is 2.0 mm or more and 3.5 mm or less.

[7] The glass article described in any one of the Items [1] to [6], wherein a thickness $t_{Si}$ of the carbon-added silicon oxide layer is 30 nm or more and 150 nm or less.

[8] The glass article described in any one of the Items [1] to [7], wherein the transparent conductive oxide layer contains at least one of a fluorine-doped tin oxide layer and an antimony-doped tin oxide layer.

[9] The glass article described in any one of the Items [1] to [8], wherein the glass article is used as a window glass for vehicle.

The above and other objects, features and advantages of the present disclosure will become more fully understood from the detailed description given hereinbelow and the accompanying drawings which are given by way of illustration only, and thus are not to be considered as limiting the present disclosure.

According to the present disclosure, it is possible to provide a glass article having an excellent heat resistance, capable of preventing any of layers disposed on a glass substrate from peeling off or being clacked even after a long period of time has elapsed after the bending thereof at a high temperature.

DESCRIPTION OF EMBODIMENTS

Figure 1A:
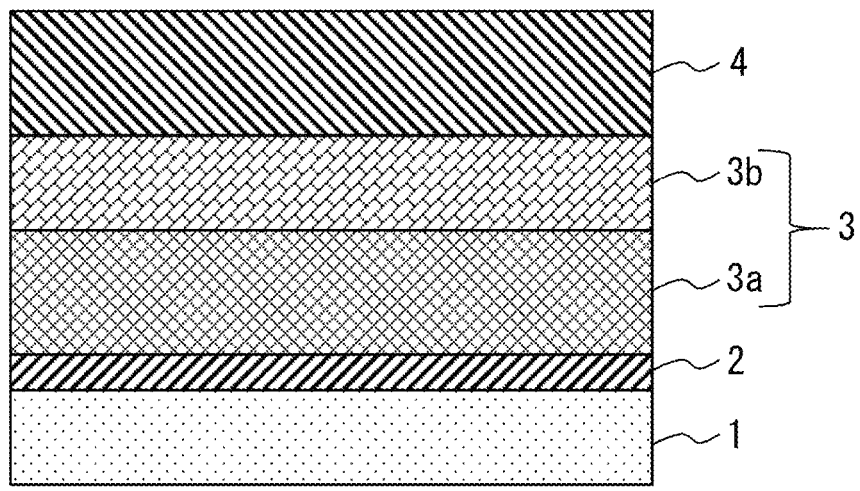
FIG. 1A is a schematic cross-sectional view of a glass article according to an embodiment of the present invention.

In this specification, when a symbol "-" (or "to"), which indicates a numerical range, is used, it means that a numerical value in front of the symbol and that behind the symbol are included as a lower limit value and an upper limit value, respectively, in the range.

Further, in the following description, an SiOC layer simply means a layer that contains silicon atoms (Si), oxygen atoms (O), and carbon atoms (C), and it is not intended to indicate that the composition ratio of these atoms (elements) is 1:1:1.

As described above, when a glass article having a structure described in Patent Literature 1 is bent at a high temperature, each layer disposed on the glass substrate, e.g., an interface between the glass substrate and the base layer, may peel off or be cracked. Further, in some cases, even when such phenomena were not observed immediately after the bending, they occurred after a certain period of time had elapsed. Further, in some cases, when such a glass article was used as a glass article for vehicle, cracks or a layer peeling was observed at the edge on the periphery of the glass substrate where the shielding layer was provided as well as in the central part of the glass substrate. This tendency was particularly noticeable when an SiOC layer having an excellent alkali diffusion prevention function is used as a base layer.

The inventors of the present application have inferred that such peeling and cracks, which may occur due to the heat bending process (and the subsequent cooling process which is performed as required) or occur after a certain period of time has elapsed, are caused by the poor adhesion between the glass substrate and the base layer and/or the contraction force of the shielding layer.

In particular, when an SiOC layer is used as the base layer, there is a possibility that the SiOC may be thermally decomposed during the bending at a high temperature, and because of this thermal decomposition, the adhesion between the glass substrate and the base layer is further lowered, thus causing peeling and cracks.

Based on the above-described inference, the inventors of the present application have conducted various studies. As a result, the inventors have found that, by limiting the composition ratio C/Si (the ratio expressed in at %) of carbon to silicon in the SiOC layer to a specific range, and reducing the linear expansion coefficient of the shielding layer to a specific value or smaller, it is possible to prevent peeling and cracks from occurring during the heat bending or even after a certain period of time has elapsed therefrom, and based on this finding, has achieved the present invention.

Embodiments of glass articles according to the present invention (hereafter, each of which is also referred to as "the present glass article") will be described hereinafter in detail with reference to the drawings, but the present invention is not limited to those embodiments.

<Glass Article>

The present glass article can be suitably used as a window glass for vehicle such as one for an automobile, and in particular, as a window glass for vehicle, and can be used in any part of a vehicle body, such as the front, rear, side, and ceiling of a vehicle body. Further, the present glass article can be used in any uses other than those in vehicles, such as uses in buildings. Further, the present glass article may have the below-described feature in at least a part of the glass article. For example, the present glass article may be used as a single glass including one glass substrate, or as a laminated glass including a plurality of glass substrates. The method for manufacturing the present glass article is not limited to any particular methods. For example, as described later, the present glass article can be manufactured by using a well-known float method.

Figure 1B:
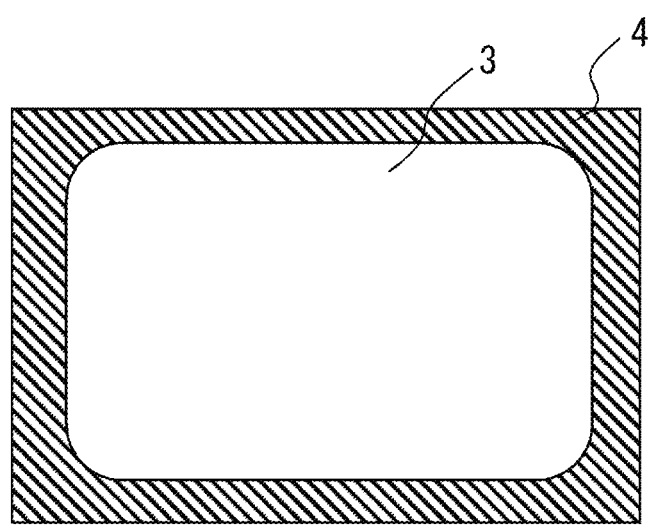
FIG. 1B is a schematic plan view of a glass article according to an embodiment of the present invention.

As shown in FIG. 1A, the present glass article includes, on a glass substrate 1, a carbon-added silicon oxide layer (SiOC layer) 2, a transparent conductive oxide (TCO: Transparent Conductive Oxide) layer (hereafter also referred to as a "TCO layer") 3, and a shielding layer 4 in this order. As described above, these layers may be successively stacked on at least a part of one surface of the glass substrate. That is, these layers may be stacked over the entire glass substrate constituting the glass article, or may not be stacked over the entire glass substrate. For example, the SiOC layer 2 and the TCO layer 3 may be disposed in this order over the entire glass substrate, and as shown in FIG. 1B, a frame-like shielding layer 4 may be disposed on a part of the TCO layer which becomes (or forms) the periphery of the glass substrate. Further, within the range in which the effects of the present invention can be obtained, the present glass article may include another layer(s), such as a color-tone adjustment layer for adjusting the color tone, between any two of the above-described layers. However, in view of the heat resistance, the present glass article is preferably composed of the glass substrate 1, the SiOC layer 2, the TCO layer 3, and the shielding layer 4. Note that each of FIGS. 1A and 1B is a schematic view of the present glass article according to an embodiment. In particular, FIG. 1A shows a schematic cross-sectional view of the present glass article and FIG. 1B shows a schematic plan view of the present glass article as viewed from the shielding layer 4 side.

In the present glass article, the composition ratio (C/Si) expressed by the atomic-composition ratio of carbon to silicon expressed in percentage (at %) in the SiOC layer, i.e., the ratio C (at %)/Si (at %) of the SiOC layer is 0.1 or more and 0.5 or less. Further, the linear expansion coefficient (the thermal expansion coefficient) $\alpha_{Sh}$ of the shielding layer is $7.7 \times 10^{-3}$/K or less.

The present glass article including the SiOC layer having a specific ratio C/Si, and the shielding layer having a specific linear expansion coefficient as described above has an excellent heat resistance and excellent adhesion between the glass substrate and the base layer, and can prevent peeling and cracks, which would otherwise be caused by the contraction force of the shielding layer, from occurring. Therefore, even in a case where the present glass article is bent into, for example, a curved shape for a vehicular use at a high temperature (e.g., 600-750° C.), it is easy to prevent any of the layers disposed on the glass substrate from peeling off or being clacked.

[Glass Substrate]

Regarding the glass substrate (the glass plate), well-known glass substrates can be used. For example, a heat-absorbing glass, a clear glass, a soda-lime-based glass, a green glass, or a UV green glass can be used. However, when the present glass article is used as a glass for vehicle, the glass substrate is required to have a visible-light transmittance conforming to the safety standards of the country in which the vehicle is used. Further, when the present glass article is used for other purposes, the glass substrate is required to have characteristics required for those purposes. Therefore, the composition of the glass substrate is preferably adjusted so as to achieve the required characteristics. Examples of the composition of the glass substrate include the below-shown composition. Note that the composition of the glass substrate can be specified by an X-ray fluorescence analysis.

$SiO_2$: 70-73 mass %,
$Al_2O_3$: 0.6-2.4 mass %,
CaO: 7-12 mass %,
MgO: 1.0-4.5 mass %, R$_2$O: 13-15 mass % (R is an alkali metal such as Na or K), and Total iron oxide (T-Fe$_2$O$_3$) in terms of Fe$_2$O$_3$: 0-0.14 mass %.

Note that the glass substrate may be substantially transparent, or may be tinted, i.e., colored.

Further, the shape of the glass substrate is not limited to any particular shapes as long as it can be bent to a shape suitable for the desired purpose. For example, the glass substrate may have a rectangular shape. The bending shape of the present glass article is, for example, a curved shape, and the curved shape is not limited to any particular curved shapes. For example, the present glass article may have a shape that is curved in the up/down direction on the paper in FIG. 1A. Note that the present glass article includes both one in which a glass substrate on which an SiOC layer, a TCO layer, and a shielding layer have already been disposed, but which has not been bent yet, and one in which the glass substrate has already been bent into a desired shape. Therefore, the glass substrate included in the present glass article may be, for example, a rectangular glass substrate that has not been bent yet or a glass substrate that has already been bent and has a curved shape.

The thickness $t_g$ of the glass substrate is not limited to any particular values, but is preferably 1.0 mm or more, more preferably 1.5 mm or more, and still more preferably 2.0 mm or more. Further, the thickness $t_g$ of the glass substrate is preferably 6.0 mm or less, more preferably 5.0 mm or less, and still more preferably 3.5 mm or less. Typically, the thickness of the glass substrate is preferably about 4.0-5.0 mm in order to prevent layer peeling and cracks. However, because the present glass article has an excellent heat resistance, it can be easily bent even when the thickness $t_g$ of the glass substrate is smaller than the ordinary thickness, for example, when the thickness $t_g$ of the glass substrate is 2.0-3.5 mm. Further, it is possible to prevent any of layers disposed on the glass substrate from deteriorating or peeling off even when the glass substrate is bent at a high temperature. Therefore, the present glass article can be suitably used not only as a single glass but also as a laminated glass, and hence can be used for various purposes.

The linear expansion coefficient $\alpha_g$ of the glass substrate can be set as desired by changing its composition. However, the linear expansion coefficient $\alpha_g$ is preferably set to $0.6 \times 10^{-6}$/K to $10 \times 10^{-6}$/K in order to prevent the base layer (the SiOC layer) from peeling during the heat bending. Further, for a similar reason, the linear expansion coefficient $\alpha_g$ is more preferably set to $1.0 \times 10^{-6}$/K to $7.0 \times 10^{-6}$/K, and still more preferably set to $1.0 \times 10^{-6}$/K to $4.0 \times 10^{-6}$/K. Note that, in order to prevent the layer peeling, the linear expansion coefficient $\alpha_g$ of the glass substrate is preferably set so that the difference from the linear expansion coefficient $\alpha_{Si}$ of the base layer becomes smaller at the bending temperature (e.g., 600-750° C.). The linear expansion coefficient $\alpha_g$ of the glass substrate can be measured by a later-described method.

The glass substrate can be manufactured as appropriate by a well-known method (e.g., a float method, a fusion method, and a rollout method), and the method for manufacturing the glass substrate is not limited to any particular methods. Note that a commercial product may be used as the glass substrate.

[SiOC Layer]

In the present glass article, a carbon-added silicon oxide layer: SiOC layer (SiOC film) is used as the base layer disposed between the glass substrate and the TCO layer. The method for stacking the SiOC layer on the glass substrate is not limited to any particular methods. However, it is preferred to use on-line coating, more specifically on-line CVD (Chemical Vapor Deposition), for depositing (i.e., forming) a film in the manufacturing process for the present glass article.

Note that the SiOC layer has excellent durability and an excellent ability of preventing void defects as well as an excellent alkali diffusion prevention function as compared with the conventional base layer such as an SnO$_2$ layer.

Further, in the present glass article, the SiOC layer may be provided on at least a part of one surface of the glass substrate. Therefore, the SiOC layer may be in contact with the glass substrate, or another layer may be disposed between the glass substrate and the SiOC layer, so that the glass substrate and the SiOC layer may not be in direct contact with each other. However, in order to prevent layer peeling and cracks, it is preferred to use, as another layer disposed between the glass substrate and the SiOC layer, one whose linear expansion coefficient is close to those of the glass substrate and the SiOC layer (i.e., a layer of which the difference of the linear expansion coefficient from those of the glass substrate and the SiOC layer is small).

In the present glass article, the composition ratio (C/Si) between carbon atoms (C) and silicon atoms (Si) in the SiOC layer is 0.1 or more and 0.5 or less. When this composition ratio is 0.1 or higher, the alkali diffusion prevention function of the SiOC layer can be further improved. When this composition ratio is 0.5 or lower, the heat resistance of the SiOC layer can be improved, so that it is possible to prevent the SiOC from being thermally decomposed and thereby generating a CO$_2$ gas during the heat bending of the present glass article (e.g., at a high temperature: 600° C. or higher). As a result, the present glass article can be bent at a high temperature and can be used in a wide variety of uses including uses for window glasses for vehicles. Further, in order to maintain the alkali diffusion prevention function of the SiOC layer, the ratio C/Si in the SiOC layer is preferably 0.15 or higher and more preferably 0.25 or higher. Further, in view of the heat resistance of the SiOC layer, the ratio C/Si in the SiOC layer is preferably 0.40 or lower and more preferably 0.30 or lower.

The at % ratio (O/Si) of oxygen atoms (O) and silicon atoms (Si) in the SiOC layer is not limited to any particular values, but in view of the heat resistance, is preferably 1.2 or higher and more preferably 1.5 or higher. Further, in order to maintain the alkali diffusion prevention function, the ratio O/Si is preferably 3.0 or lower and more preferably 2.5 or lower.

The atomic composition percentage of oxygen atoms (O) in the SiOC layer is preferably 45 at % or higher, more preferably 50 at % or higher, and still more preferably 55 at % or higher. When the at % of oxygen atoms is these lower limit values or higher, the heat resistance of the SiOC layer can be further improved. Further, the at % of oxygen atoms in the SiOC layer is preferably 70 at % or lower, more preferably 65 at % or lower, and still more preferably 62 at % or lower. When the at % of oxygen atoms is below these upper limit values or lower, an excellent alkali diffusion prevention function can be easily given to the SiOC layer.

The atomic composition percentage of carbon atoms (C) in the SiOC layer is preferably 2 at % or higher, more preferably 3 at % or higher, and still more preferably 4 at % or higher. Further, the at % of carbon atoms in the SiOC layer is preferably 20 at % or lower, more preferably 15 at % or lower, and still more preferably 10 at % or lower. When the at % of carbon atoms is these lower limit values or higher, an excellent alkali diffusion prevention function can be easily given to the SiOC layer. Further, when the at % of carbon atoms is these upper limit values or lower, the heat resistance of the SiOC layer can be further improved.

The atomic composition percentage of silicon atoms (Si) in the SiOC layer is preferably 20 at % or higher, more preferably 23 at % or higher, and still more preferably 25 at % or higher. Further, the at % of silicon atoms in the SiOC layer is preferably 35 at % or lower, more preferably 34 at % or lower, and still more preferably 32 at % or lower. When the at % of silicon atoms is these lower limit values or higher, the heat resistance and the alkali diffusion prevention function of the SiOC layer can be further improved. Further, when the at % of silicon atoms is these upper limit values or lower, an excellent heat resistance and an excellent alkali diffusion prevention function can be easily given to the SiOC layer.

Note that the SiOC layer can contain, for example, Na atoms and Ca atoms in addition to the aforementioned O, C and Si atoms. In order to give an excellent heat resistance and an excellent alkali diffusion prevention function to the glass article, the total at % of O, C and Si atoms in the SiOC layer is preferably 85-99 at % and more preferably 90-98 at %, The composition of the SiOC layer can be adjusted as appropriate by changing the conditions for supplying the raw-material gas (the mixed gas) when the CVD is performed. For example, the composition of the SiOC layer can be adjusted by the conditions for increasing or decreasing the oxidation level of the raw-material gas (e.g., $CO_2/SiH_4$, $CO_2/C_2H_4$), i.e., by increasing or decreasing the amount of supplied $CO_2$ gas used as the raw-material gas. Further, the atomic composition of the SiOC layer can be measured by a method described later.

The linear expansion coefficient $\alpha_{Si}$ of the SiOC layer is preferably $0.6 \times 10^{-6}$/K or higher, more preferably $0.8 \times 10^{-6}$/K or higher, and more preferably $1.0 \times 10^{-6}$/K or higher. When the linear expansion coefficient $\alpha_{Si}$ of the SiOC layer is these lower limit values or higher, an excellent alkali diffusion prevention function can be easily given to the base layer. Further, the linear expansion coefficient $\alpha_{Si}$ of the SiOC layer is preferably $4.0 \times 10^{-6}$/K or lower, more preferably $3.5 \times 10^{-6}$/K or lower, more preferably $3.0 \times 10^{-6}$/K or lower, and particularly preferably $2.9 \times 10^{-6}$/K or lower. Further, when the linear expansion coefficient $\alpha_{Si}$ of the SiOC layer is these upper limit values or lower, the heat resistance of the SiOC layer can be further improved and the adhesion between the glass substrate and the base layer can also be further improved.

Note that the linear expansion coefficient $\alpha_{Si}$ of the SiOC layer can be adjusted by adjusting the ratios C/Si and O/Si in the SiOC layer as appropriate. The linear expansion coefficient $\alpha_{Si}$ of the SiOC layer can be measured by a method described later.

The thickness $t_{Si}$ of the SiOC layer can be set as desired and is not limited to any particular values. However, to improve both the heat resistance and the alkali diffusion prevention function, the thickness $t_{Si}$ is preferably 30 nm or higher, more preferably 35 nm or higher, and still more preferably 40 nm or higher. Further, in view of the smoothness, the thickness $t_{Si}$ of the SiOC layer is preferably 150 nm or lower, more preferably 120 nm or lower, and still more preferably 100 nm or lower.

[TCO Layer]

It is known that the transparent conductive oxide layer (the TCO layer) used in the present glass article has an excellent Low-E property as described above, and the TCO layer can contain, for example, doped tin oxide and doped zinc oxide, and a mixture of two or more of such oxides. In addition, the TCO layer may contain stannic acid alkali metal (e.g., potassium, sodium, and lithium), zinc stannate, cadmium stannate, and a mixture of two or more of such stannates.

Among these, the TCO layer is preferably a doped tin oxide layer because it has an excellent Low-E property. Further, for a similar reason, it is more preferred that the TCO layer contains at least one of a fluorine-doped tin oxide ($F:SnO_x$) layer and an antimony-doped tin oxide ($Sb:SnO_x$) layer. Note that their oxidation level (e.g., x: 2) can be adjusted by changing the film-forming conditions, e.g., the CVD film-forming conditions, and is not limited to any particular values.

Figure 2A:
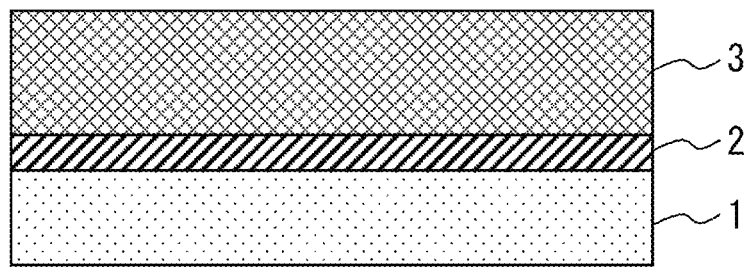
FIG. 2A is a schematic cross-sectional view for explaining an embodiment of a glass article according to the present invention, and shows a case where a transparent conductive oxide layer is composed of one layer.

As shown in FIG. 2A, the TCO layer may be composed of one TCO layer 3 composed of an $F:SnO_x$ layer. As described above, the present glass article having the structure in which the TCO layer is composed of one layer can have a visible-light transmittance Tv of 80% or higher (e.g., 83%) as measured according to ISO 9050 and JIS-R3106. The present glass article including the TCO layer having the above-described structure can be used, owing to its high Tv, in the front part of or in the front-side part of the vehicle body of a vehicle, specifically as a windshield, or a side window glass on the driver's seat side or on the passenger seat side of a vehicle.

Figure 2B:
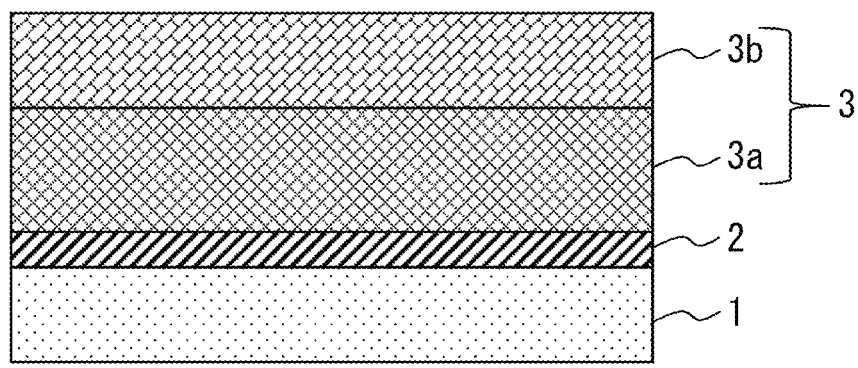
FIG. 2B is a schematic cross-sectional view for explaining an embodiment of a glass article according to the present invention, and shows a case where a transparent conductive oxide layer is composed of two layers.

Further, as shown in FIGS. 1A and 2B, the TCO layer may be composed of two or more layers including an $Sb:SnO_x$ layer serving as a first TCO layer 3a, and an $F:SnO_x$ layer serving as a second TCO layer 3b. As described above, the present glass article having the structure in which the TCO layer is composed of two or more layers can have a visible-light transmittance Tv of 25% or lower (e.g., 18%). The present glass article including the TCO layer having the above-described structure can be used, owing to its low Tv, as a window glass in the rear-side part or the ceiling, or the rear part of a vehicle.

Note that each of FIGS. 2A and 2B is a schematic cross-sectional view for explaining an embodiment of the present glass article, and FIGS. 2A and 2B show cases where the TCO layer is composed of one layer and two layers, respectively. Note that the illustration of the shielding layer is omitted in FIGS. 2A and 2B.

The thickness of the TCO layer is not limited to any particular values. However, in order to give an excellent Low-E property, the total thickness $t_{TCO}$ of the TCO layer is preferably 50-700 nm and more preferably 100-650 nm. Further, for a similar reason, the thickness of the $F:SnO_x$ layer is preferably 100-500 nm and more preferably 150-350 nm. Further, for a similar reason, the thickness of the $Sb:SnO_x$ layer is preferably 250-500 nm and more preferably 300-450 nm.

The method for stacking the TCO layer on the SiOC layer is not limited to any particular methods. However, it is preferred to use an on-line coating, more specifically, on-line CVD, for forming a film in the manufacturing process of the present glass article. Further, in the present glass article, the TCO layer may be provided on at least a part of the SiOC layer. Therefore, the TCO layer (in the cased of a multi-layer structure, a TCO layer closest to the glass substrate) may be in contact with the SiOC layer, or another layer may be disposed between the SiOC layer and the TCO layer, so that the SiOC layer and the TCO layer may not be in direct contact with each other. However, in order to prevent layer peeling and cracks, it is preferred to use, as another layer disposed between the SiOC layer and the TCO layer, one whose linear expansion coefficient is close to those of the SiOC layer or the TCO layer.

The linear expansion coefficient $\alpha_{TCO}$ of the TCO layer can be set as appropriate and is not limited to any particular values. However, in order to prevent any of the layers disposed on the glass substrate from peeling off, it is preferred that the difference from the linear expansion coefficient $\alpha_{Si}$ of the SiOC layer is small. For example, the linear expansion coefficient $\alpha_{TCO}$ is preferably in the below-shown range. That is, the linear expansion coefficient $\alpha_{TCO}$ of the TCO layer is preferably $1.0\times10^{-6}$/K or more and $9.0\times10^{-6}$/K or less. For example, a TCO layer having a linear expansion coefficient $\alpha_{TCO}$ of $4.0\times10^{-6}$/K can be used for the present glass article. In the case where the TCO layer is composed of a plurality of layers, all of the plurality of TCO layers may satisfy the above-described linear expansion coefficient range. However, it is preferred that the linear expansion coefficient of at least one of the plurality of TCO layers that is closest to the glass substrate, i.e., the TCO layer on the SiOC layer side, is in the above-described range. The linear expansion coefficient $\alpha_{TCO}$ of the TCO layer can be measured by a method described later.

[Shielding Layer]

The shielding layer may be disposed on at least a part of one surface of the glass substrate, specifically, on at least a part of the TCO layer. However, when the present glass article is used as a glass article for vehicle, it is preferred that the present glass article is provided so as to cover the periphery of the glass substrate. Owing to this shielding layer, for example, components for mounting the glass article onto the vehicle body and terminals of electrical components cannot be seen from the outside.

Note that the shape of the shielding layer can be, for example, any of various shapes such as a frame-like shape, a band-like shape, and a dot-pattern shape. In FIG. 1B, a frame-shaped shielding layer 4 is provided on the periphery of the glass substrate, more specifically, on the periphery of the TCO layer 3. Note that the shielding layer can be provided, for example, so as to cover a specific area extending from the edge of the glass substrate. More specifically, the shielding layer can cover an area within at least 30 mm (e.g., within 50 mm) from the edge of the glass substrate.

The shielding layer preferably contains a crystalline component and a pigment. Further, a crystallinity value of the shielding layer, which is expressed by a diffraction intensity: CPS (counts per second) ratio of the crystalline component to the pigment, in X-Ray Diffraction measurement data of the shielding layer, is preferably 7 or more and 33 or less. The crystalline component in the shielding layer can provide a non-adhesive property that is advantageous for the compression-bending process, which is performed in the automotive glass industry, and thereby can provide an excellent mold-release property. Note that, regarding the above-described crystalline component, the crystal form (the crystal structure) in the state in which the crystalline component is present inside the shielding layer may be different from or identical to the crystal form measured by the above-described XRD.

When the crystallinity value of the shielding layer, i.e., the CPS of the crystalline component/the CPS of the pigment is 7 or higher, the crystallinity is further improved and the surface unevenness of the shielding layer is increased, so that the mold-release property in the bending process can be further improved. For a similar reason, the crystallinity value of the shielding layer is more preferably 10 or higher, and particularly preferably 11 or higher. Further, when the crystallinity value of the shielding layer is 33 or lower, it is easy to prevent the layer peeling on the glass substrate when the glass article is formed at a high temperature. For a similar reason, the crystallinity value of the shielding layer is more preferably 20 or lower, and particularly preferably lower than 15 (e.g., 14 or lower). Note that when the shielding layer contains a plurality of types of crystalline components and/or a plurality of types of pigments, in regard to the CPS of the crystalline component and the CPS of the pigment, the above-described crystallinity value is calculated by using the total value of the plurality of types of CPSs for each.

Note that the crystallinity value of the shielding layer can be adjusted by changing the raw materials used for the shielding layer (i.e., the crystalline component and the pigment) and/or changing the conditions for the firing when the shielding layer is fired. Examples of the firing conditions include a firing speed (a conveyance speed) (mm/s) and a firing temperature (° C.) when an object to be processed (on which the materials for forming the shielding layer are applied) is conveyed in the process for bending an automotive glass, and also include, when the firing temperature is changed during the firing, a temperature profile and the like. Specifically, the crystallinity value can be increased by lowering the firing speed of the shielding layer and/or increasing the firing temperature. Conversely, the crystallinity value can be decreased by increasing the firing speed of the shielding layer and/or lowering the firing temperature. The firing conditions for the shielding layer can be set as appropriate. For example, the firing speed can be set to 5-30 mm/s (preferably 10-25 mm/s), and the firing temperature can be set to 550-730° C. (preferably 580-710° C. and more preferably 680-710° C.). The below-shown Table 1 shows an example of a relationship between crystallinity values of a shielding layer, and firing speeds and firing temperatures of the shielding layer.

TABLE 1

| | Crystallinity Value of Shielding Layer | |
|---|---|---|
| | Firing Speed (mm/s) | |
| | 10 | 25 |
| Firing Temperature (° C.) 680 | 16.72 | 11.32 |
| 690 | 18.28 | 12.73 |
| 700 | 18.29 | 12.90 |
| 710 | 18.27 | 14.29 |

The shielding layer (e.g., a black ceramic layer) can be formed by coating a material for forming the shielding layer (e.g., a ceramic paste) on the glass substrate, or more specifically, in a desired part (e.g., on the periphery) on the TCO layer, and heating them at a high temperature and thereby sintering them.

The material for forming the shielding layer before the firing include at least a frit (corresponding to the crystalline component when the shielding layer is formed) and a pigment (e.g., a heat-resistant black pigment), and may also include, as required, an (organic) vehicle for dispersing the pigment, a conductive metal, a reducing agent, a dispersive surfactant, a fluidity modifier, a fluidity aid, an adhesion promoter, a stabilizer, a colorant, and the like. Note that a commercial product can be used as the material for forming the shielding layer. Examples of the commercial product for the material for forming the shielding layer include a product name: 14501 (manufactured by Ferro Corporation).

The aforementioned frit may contain, for example, at least one type of (solid) crystalline material such as zinc borate, zinc silicate, aluminum silicate, zinc titanate, and bismuth silicate. Further, the frit may also contain, in addition to the aforementioned material, at least one of $SiO_2$, $Bi_2O_3$, $Cs_2O$, $Na_2O$, $B_2O_3$, ZnO, $TiO_2$, $La_2O_3$, $Nb_2O_5$, $MnO_2$, $CeO_2$, $MoO_3$, $WO_3$, F, $Al_2O_3$, BaO, and the like. The frit can be selected as appropriate within the range in which the linear expansion coefficient $\alpha_{sh}$ of the shielding layer satisfies a predetermined value which will be described later, and the combination of them is also arbitrarily determined. Note that it is known that a frit having a high melting point range has an excellent chemical resistance and a relatively low thermal expansion coefficient.

When the shielding layer is formed, the frit may or may not have a crystal form different from that at the raw-material stage before the firing (i.e., that of the material for forming the shielding layer). Further, the crystalline component in the shielding layer may be composed of one type of frit, or may be formed by, for example, fusing a plurality of types of frits together by the firing. In examples described later, $Bi_4(SiO_4)_3$ was observed as the above-described crystalline component in X-ray diffraction measurement data.

Further, the frit can be manufactured by a well-known method. For example, a frit having a desired composition can be manufactured by, after mixing starting raw materials according to the desired composition, melting the mixture at a desired temperature over a desired time and, if necessary, cooling the melt by using water or the like. If necessary, the frit can be ground into a desired particle size (e.g., 1-8 μm) by using a well-known grinding technique. Note that a commercial product can be used as the frit.

The content of the frit contained in the material for forming the shielding layer can be set as appropriate within the range in which the above-described crystallinity value is satisfied when the firing is performed. However, in order to make the adjustment of the crystallinity value of the shielding layer easy, the content of the frit is preferably 60-99 mass %, more preferably 65-95 mass %, and still more preferably 70-85 mass %.

Regarding the above-described pigment, a well-known one can be used as appropriate. However, for example, one that is derived from at least one of composite inorganic pigments, such as corundum-hematite, olivine, priderite, paichlor, rutile, spinel, or the like can be used. Regarding the pigment, for example, a metal oxide pigment (a spinel pigment) containing copper (Cu), chromium (Cr), iron (Fe), cobalt (Co), nickel (Ni), manganese (Mn), aluminum (Al), magnesium (Mg), zinc (Zn), zirconium (Zr), niobium (Nb), yttrium (Y), tungsten (W), antimony (Sb), calcium (Ca) or the like can be used. These black spinel pigments can be suitably used in the automotive industry. Meanwhile, in other industries such as construction, home appliances, and beverage industries, other metal oxide pigments that produce other colors can be used as appropriate as the pigment(s).

Note that the spinel structure is an ordinary pigment structure expressed by a general formula $AB_2X_4$ in which X is typically $O^{2-}$ or F— having almost the same ionic radius. In the formula, A and B represent tetrahedral and octahedral sites, respectively, in the standard spinel lattice. The spinel structure can be formed from a number of different elements including transition elements in Group I (first row transition elements), and hence serves as structures of a number of inorganic pigments. Many of the spinel compounds have cubic space groups, but distorted spinel structures can have a tetragonal phase and sometimes an orthorhombic phase.

Specific examples of metal oxide pigments include $CuO \cdot CrO_3$, $CuCr_2O_4$, $(Co, Fe)(Fe, Cr)_2O_4$, $MnCr_2O_4$, NiMnCrFe, CuCrMnO, and pigments obtained by modifying them by using modifiers. Note that properties of a pigment can be determined by raw materials, synthesizing techniques and conditions therefor, and processes performed after firing. The pigment may be synthesized by a well-known method, for example, a method disclosed in Published Japanese Translation of PCT International Publication for Patent Application, No. 2019-509959. Alternatively, a commercial product may be purchased, and its composition may be adjusted so that the linear expansion coefficient $\alpha_{sh}$ of the shielding layer has a predetermined value or lower.

For example, a desired pigment can be formed by chemically combining and calcining a micro-metal oxide or a salt containing a metal of interest. When doing so, the size of the micro-metal oxide can be adjusted as appropriate, and is preferably 1 nm to 10 μm, more preferably 10 nm to 1 μm, and still more preferably 50-500 nm.

Further, as the pigment, one derived from a rare-earth manganese oxide can also be used. For example, (YxMn)Oy, (LaxMn)Oy, (CexMn)Oy, (PrxMn)Oy, or (NdxMn)Oy can be used. Note that in the above-shown chemical formula, "x" is preferably 0.01-99, more preferably 0.08-12, and still more preferably 0.25-4. Further, in the above-shown chemical formula, "y" is the number of oxygen atoms required to maintain electrical neutrality, and is preferably x+1 to 2x+2. Specific examples of the pigment include $CeMnO_3$, $PrMnO_3$, $NdMnO_3$, and pigments obtained by modifying them by using modifiers. Note that it is preferred that the rare-earth manganese oxide pigment has a perovskite crystal structure or an orthorhombic crystal structure. By using the rare-earth manganese oxide pigment, a high infrared reflectivity can be obtained and a heat generation characteristic can be reduced. Further, no cobalt material is contained in the pigment, so that no hexavalent chromium is generated and elute even when the pigment comes into contact with an acidic solution such as acid rain.

The content of the pigment in the material for forming the shielding layer can be set as appropriate within the range in which the above-described crystallinity value is satisfied when the firing is performed. However, in order to make the adjustment of the crystallinity value of the shielding layer easy, the content of the pigment is preferably 0.1-50 mass %, more preferably 1-25 mass %, and still more preferably 2-25 mass %.

Examples of the organic vehicle for dispersing and suspending the above-described frit and the pigment include vegetable oil, mineral oil, low molecular weight petroleum distillate, tridecyl alcohol, synthetic resins, and natural resins.

As the conductive metal, for example, silver (silver particles) can be used.

As the reducing agent, for example, silicon metal can be used.

The dispersive surfactant functions as an aid for helping the pigment get wet when an inert fine particulate inorganic pigment is used. The dispersive surfactant typically contains a block copolymer containing a group having an affinity for the pigment, and also contains, if necessary, a solvent (e.g., xylene, butyl acetate, methoxypropyl acetate). A well-known dispersive surfactant can be used as appropriate. For example, Disperbyk 162 (product name, manufactured by BykChemie) can be used.

The fluidity modifier is used to adjust the viscosity and a well-known one can be used as appropriate. For example, Viscobyk series (manufactured by BykChemie) can be used.

The fluidity aid is an additive used to adjust the viscosity and the fluidity, and a well-known one can be used. For example, AdditolVXW 6388 (product name, manufactured by UCB Surface Speciality) can be used.

The adhesion promoter is used to improve the compatibility (suitability) with the layer in which the shielding layer is disposed (i.e., the TCO layer), and can be selected as appropriate according to the composition of the used TCO layer.

As the stabilizer, for example, a light stabilizer or a UV blocking agent can be used.

Note that the amounts of these additives to be mixed can be determined as appropriate and are not limited to any particular values.

The linear expansion coefficient $\alpha_{sh}$ of the shielding layer is $7.7 \times 10^{-3}$/K or lower. By setting the linear expansion coefficient $\alpha_{sh}$ of the shielding layer to the above-shown value or lower, it becomes easy to reduce the peeling force caused by the contraction of the shielding layer during the high-temperature bending and the cooling, and to prevent any of the layers on the glass substrate from peeling off. Further, for a similar reason, the linear expansion coefficient $\alpha_{sh}$ of the shielding layer is preferably $7.5 \times 10^{-3}$/K or lower. The smaller the linear expansion coefficient $\alpha_{sh}$ of the shielding layer is, the more desirable it is. In particular, the smaller the difference from the linear expansion coefficient of the TCO layer, which is disposed at the lower part of the shielding layer, is, the more desirable it is. The linear expansion coefficient $\alpha_{sh}$ of the shielding layer can be measured by a method described later.

The ratio of the C/Si of the SiOC layer to the crystallinity value of the shielding layer ((C/Si of SiOC layer)/(crystallinity value of shielding layer)) is preferably 0.005 or more and 0.04 or less. When this ratio is 0.04 or lower, it is easy to achieve both the excellent mold-release property in the bending process and the excellent heat resistance of the SiOC layer. Further, for a similar reason, this ratio is more preferably 0.03 or lower and more preferably 0.02 or lower.

Further, when this ratio is 0.005 or higher, the SiOC layer exhibits an excellent alkali diffusion prevention function, and the peeling of any of the layers on the glass substrate, which would otherwise occur when the glass article is bent at a high temperature, can be easily prevented. Further, for a similar reason, this ratio is more preferably 0.008 or higher and still more preferably 0.010 or higher.

The thickness $t_{sh}$ of the shielding layer can be set as appropriate. However, to improve the light stability and the concealment of the squeezed-out adhesive, the thickness tsh is preferably 8 μm or more and 20 μm or less, and more preferably 10 μm or more and 15 μm or less.

<Method for Manufacturing Glass Article>

The method for manufacturing the present glass article is not limited to any particular methods. However, the present glass article can be manufactured by a manufacturing method including, for example, the following steps.

A step of preparing a glass substrate (a substrate preparation step).

A step of forming an SiOC layer on the glass substrate (an SiOC layer formation step).

A step of forming a TCO layer on the SiOC layer (a TCO layer formation step).

A step of forming a shielding layer on the TCO layer (a shielding layer formation step).

The substrate preparation step (a substrate producing step) can include a step of melting a glass raw material and pouring the molten glass raw material into a tin bath (a melting step), and a step of slowly cooling the molten glass raw material (a slow cooling step).

The TCO layer formation step can include, for example, the following steps.

A step of forming a first TCO layer on the SiOC layer (a first TCO layer formation step).

A step of forming a second TCO layer on the first TCO layer (a second TCO layer formation step).

The shielding layer formation step can include, for example, the following steps.

A step of preparing a material for forming a shielding layer (a shielding layer formation material preparation step).

A step of coating the material for forming the shielding layer on the TCO layer (a coating step).

A step of sintering the material for forming the shielding layer coated on the TCO layer (a sintering step).

Further, the above-described manufacturing method can include the following steps.

A step of heat-bending the glass substrate, on which the SiOC layer, the TCO layer, and the shielding layer have been disposed in this order, into a desired shape (a heat-bending step).

A step of cooling the heat-bent glass substrate (a cooling step).

These steps may be successively performed, or a plurality of steps (e.g., the substrate preparation step (specifically, the melting step) and the SiOC layer formation step, the shielding layer formation step (specifically, the sintering step) and the heat-bending step) may be performed in parallel with each other.

The above-described manufacturing method will be described hereinafter in detail.

Firstly, for example, a rectangular glass substrate (a glass plate) is prepared (the substrate preparation step). Note that, regarding the glass substrate, commercially-purchased one may be used, or the glass substrate can be manufactured by, for example, the following method. That is, a molten glass is obtained by heating a glass raw material, which is obtained by mixing necessary components so that a desired glass composition is obtained, at a predetermined temperature. Next, the obtained molten glass is poured into a tin bath filled with molten tin (the melting step), and a plate-like glass ribbon is thereby formed. Then, the glass ribbon is slowly cooled (the slow cooling step), so that a glass substrate is obtained. Note that an additional process(es) (e.g., an $SO_2$ process and a washing process) may be performed for the obtained glass ribbon. Note that the bending of the glass substrate can be performed in either the above-described melting step or the slow cooling step. Further, when the glass substrate is produced, it can be cut into a desired size as appropriate.

Next, an SiOC layer is formed in at least a part of one surface of the glass substrate, for example, over the entire one surface of the glass substrate (the SiOC layer formation step). As described above, the SiOC layer is preferably produced by using the on-line CVD method in which a film is formed directly on the glass substrate on the float line. Specifically, the SiOC layer is formed by spraying, with a normal pressure (1,013 hPa), a mixed raw-material gas onto the glass substrate which has been heated to a predetermined temperature. Note that, as the raw-material gas, a mixture gas comprising a silane gas, an ethylene gas, a carbon dioxide gas, and a nitrogen gas can be used. The composition of the SiOC layer to be produced can be adjusted by changing the mixture or the like of the raw-material gas. Note that the formation of the SiOC layer using the on-line CVD method can be performed in parallel with the melting step in the above-described production process of the glass substrate. That is, the SiOC layer may be formed, in the above-described melting step, by spraying the above-described raw-material gas onto the glass surface of the molten glass poured into the tin bath. As described above, the formation of the layer by the on-line CVD method can be performed in parallel with the manufacturing process of the glass substrate.

Next, a TCO layer is formed on at least a part of the SiOC layer, for example, over the entire surface of the SiOC layer (the TCO layer formation step). Note that when the TCO layer is composed of two or more layers, these layers are successively formed. For example, when the TCO layer is composed of a first TCO layer and a second TCO layer, the first TCO layer is formed on the SiOC layer (the first TCO layer formation step), and then the second TCO layer is formed on the first TCO layer (the second TCO layer formation step). As described above, the TCO layer is preferably successively produced after the SiOC layer is produced on the glass substrate by using the on-line CVD method. Specifically, the TCO layer is formed by spraying, with a normal pressure, the mixed raw-material gas onto the glass substrate on which the SiOC layer heated to a predetermined temperature has already been formed. Note that when an Sb:SnO$_x$ layer is produced as the TCO layer, a mixed gas comprising an MBTC (MonoButyltin TriChloride) raw material, an Sb raw material, an HCl gas, and an NHO$_3$ gas can be used as the raw-material gas. Further, when an F:SnO$_x$ layer is manufactured as the TCO layer, a mixed gas comprising an MBTC raw material, an F raw material (trifluoroacetic acid (TFA)), an oxygen gas, and a nitrogen gas can be used as the raw-material gas. The composition of the TCO layer to be produced can be adjusted by changing the mixture or the like of the raw-material gas.

Next, a frame-shaped shielding layer is formed on at least a part of the TCO layer (the topmost TCO layer when the TCO layer is composed of a plurality of layers), for example, on the periphery of the TCO layer (the shielding layer formation step). Specifically, a material for forming a shielding layer (e.g., a ceramic color paste) is coated on at least a part of the glass substrate, on which the SiOC layer and the TCO layer have already been formed, (the coating step), and dried as required. The method for coating the material for forming a shielding layer is not limited to any particular methods. For example, a screen-printing method or an inkjet method can be used. Specifically, it is preferred to print it on the glass substrate by using a #150-#250 mesh screen.

Note that a commercial product may be used for the material for forming a shielding layer, or the material for forming a shielding layer may be separately prepared (the shielding layer formation material preparation step). The material for forming a shielding layer can be prepared, for example, by dispersing the above-described desired frit and the pigment in an organic vehicle.

Next, the obtained glass substrate is heated to a predetermined temperature by using, for example, a firing furnace such as an IR furnace, and the material for forming a shielding layer is sintered on the glass substrate (the sintering step). The heating (firing) temperature is not limited to any particular temperatures, but is preferably 550-730° C. Further, the firing speed (the conveyance speed) is also not limited to any particular speeds, but is preferably 5-30 mm/s. By changing these firing conditions, the crystallinity value of the shielding layer to be produced can be adjusted.

Through the above-described processes, the shielding layer is formed on the glass substrate.

Next, the glass substrate, in which the SiOC layer, the TCO layer, and the shielding layer have been disposed in this order is heat-bent into a desired shape (the heat-bending step), and a cooling process is performed as required (the cooling step). Note that the glass substrate may be formed into a desired shape by performing self-weight bending or press bending in a state in which the glass substrate is held at the heating temperature used in the above-described sintering step. That is, the heat-bending step and the above-described sintering step may be performed in parallel with each other.

In the press bending, for example, the glass plate is bent by using a press apparatus (a heating-type press apparatus) so that its shape conforms to a desired shape of the window glass for vehicle. In the self-weight bending, the glass substrate is bent by a self-weight bending apparatus. Further, air-quenching tempering or the like may be performed according to the safety standards required for the window glass for vehicle.

The present glass article obtained through the above-described processes has an excellent heat resistance and can prevent any of the layers disposed on the glass substrate from peeling off or being clacked. Further, the present glass article does not use any whisker-like refractory, and can achieve both the low-temperature sintering property of the material for forming the shielding layer and the high plate strength of the glass article.

EXAMPLES

The present invention will be described hereinafter in a more detailed manner by using a plurality of examples, but the present invention is not limited to those examples. Note that Examples 1 to 3 are examples for the present glass article, and Examples 4 to 6 are comparative examples thereof.

Example 1

(Example 1-1) Manufacturing of Glass Substrate

A molten glass was obtained by heating glass raw materials SiO$_2$, Al$_2$O$_3$, MgO, CaO, Na$_2$O and K$_2$O to a temperature of 1,450-1,700° C. Next, the above-described molten glass was poured into a tin bath filled with molten tin, and a plate-like glass ribbon was thereby bent. Note that the inside of the tin bath was a mixed-gas atmosphere of H$_2$ and N$_2$, and the temperature on the upstream side was 950-1, 200° C. and that on the downstream side was 500-950° C. Next, the obtained glass ribbon was slowly cooled, and during this process, an SO$_2$ process was performed at the same time in the slowly-cooled furnace. Specifically, a mixture gas of a SO$_2$ gas and air was sprayed from the bottom surface side of the glass ribbon (the surface that had been in contact with the tin bath). Then, after the SO$_2$ process, the obtained glass ribbon was washed with a mixture of calcium carbonate and water and then with a mixture of a neutral detergent and water, so that the sulfate protective layers adhering to both surfaces of the glass ribbon were removed. As a result, a glass substrate was obtained. Note that the thickness of the glass substrate was 2.1 mm. The composition of the produced glass substrate is shown in Table 2 shown below. Note that, in general, the composition of a part of the glass substrate near the surface thereof is not stable. Therefore, the content of each of the mixed components in the Table 2 indicates the mass percentage based on the oxide at a depth of about 5,000 nm from the surface of the glass substrate at which the composition is stable.

TABLE 2

| Component | Content (%) |
|---|---|
| $SiO_2$ | 71.4 |
| $Al_2O_3$ | 1.1 |
| MgO | 5.5 |
| CaO | 7.8 |
| $Na_2O$ | 13.6 |
| $K_2O$ | 0.4 |
| Remnant (Impurity) | 0.2 |

(Example 1-2) Manufacturing of SiOC Layer and TCO Layer

An SiOC layer, a first TCO layer, and a second TCO layer were successively formed on one surface of the glass substrate by using an on-line CVD apparatus. Specifically, firstly, under the below-shown conditions for depositing the SiOC layer, the SiOC layer having the below-shown thickness was produced by spraying, with a normal pressure, a mixed gas comprising the below-shown raw-material gases on one surface of the glass substrate which had been heated to 600-1,100° C.

—SiOC Layer Film-Forming Condition
Raw material gas: silane gas (0.585 kg/hr), ethylene gas (2.03 kg/hr), carbon dioxide gas (6.10 kg/hr), and nitrogen gas (4.30 kg/hr).
Glass substrate temperature: 600-1,100° C.
Film-forming pressure: normal pressure.
Film thickness of SiOC layer: 80 nm.

Next, under the below-shown conditions for depositing the first TCO layer, a mixed gas comprising the below-shown raw materials was sprayed, with a normal pressure, onto the surface of the SiOC layer heated to 600-1,100° C., and a first TCO layer (SnOx:Sb) having the below-shown thickness was thereby produced.

—First TCO Layer Film-Forming Condition
Raw material: MBTC raw material (37.3 L/hr), Sb raw material (6.0 vol %: ratio to 100 vol % of MBTC raw material), HCl gas (7.17 kg/hr), and $NHO_3$ gas (38.9 L/hr).
Glass substrate temperature: 600-1,100° C.
Film-forming pressure: normal pressure.
Film thickness: 430 nm.

Next, under the below-shown conditions for depositing the second TCO layer, a mixed gas comprising the below-shown raw materials was sprayed, with a normal pressure, onto the entire surface of the first TCO layer heated to 600-1,100° C., and a second TCO layer (SnOx:F) having the below-shown thickness was thereby produced.

—Second TCO Layer Film-Forming Condition
Raw materials: MBTC raw material (18.18 L/hr), F raw material (TFA) (7.08 L/hr), oxygen gas (24.43 $Nm^3$/hr), nitrogen gas (20.28 $Nm^3$/hr).
Glass substrate temperature: 600-1,100° C.
Film-forming pressure: normal pressure.
Film thickness: 200 nm.

(Example 1-3) Manufacturing of Shielding Layer

A shielding layer containing, in XRD measurement data, $Bi_4(SiO_4)_3$ as the crystalline component and a CuCrMnO spinel pigment as the pigment was manufactured on the above-described glass substrate, specifically on the periphery of the second TCO layer. Specifically, a commercially available material for forming a shielding layer (product name: 14501, manufactured by Ferro Corporation) was printed on the periphery of the second TCO layer by a screen-printing method using a #150-#250 mesh screen, and was dried. Next, the material for forming the shielding layer was fired by using a firing furnace (an IR furnace) under the below-shown firing conditions, so that the material for forming the shielding layer was sintered on the glass substrate and a frame-shaped shielding layer as shown in FIG. 1B was thereby formed.

—Firing Condition
Firing temperature: 680-710° C.,
Firing speed (conveyance speed): 5-30 mm/s.
Note that the thickness of the shielding layer was 15 μm.
Through the above-described processes, a glass substrate in which the SiOC layer, the TCO layer, and the shielding layer were stacked was be able to be obtained.

<Evaluation Method>
The glass substrate manufactured in the Example 1 was evaluated by using the below-shown evaluation method.

[Heat Resistance Evaluation (Evaluation of Occurrence of Peeling and Crack)]

In the Example 1, a curved window glass for vehicle was manufactured by performing press bending in addition to the above-described process when the shielding layer was sintered on the glass substrate at 680-710° C. The obtained window glass for vehicle was put into a high-temperature and high-humidity tank (at a temperature of 80° C. or higher and a relative humidity of 95% or higher), and the presence/absence of an occurrence of peeling or a crack was visually checked (i.e., checked by human eyes) every 24 hours. Further, evaluations were made based on the below-shown evaluation criteria. The results of the evaluations are shown in Table 3 which will be described later.

—Evaluation Criteria
4: Neither peeling nor crack occurred after 2,000 hours had elapsed.
3: Neither peeling nor crack occurred after 1,500 hours had elapsed.
However, peeling and/or a crack(s) occurred in the period between 1,500 and 2,000 hours.
2: Neither peeling nor crack occurred after 1,000 hours had elapsed.
However, peeling and/or a crack(s) occurred in the period between 1,000 and 1,500 hours.
1: peeling and/or a crack(s) occurred before 1,000 hours had elapsed.

<Physical Property Measurement Method>
The method for measuring each physical property of the glass substrate is as follows.

[Linear Expansion Coefficient]
The linear expansion coefficient of a glass substrate and that of each layer (the shielding layer in this example) stacked on the glass substrate were measured based on the below-described method. That is, a thermal expansion curve of an object to be measured, which has been cut into a predetermined shape (e.g., a rod-like shape having a length of 5 cm) was measured by using an Orton dilatometer in a temperature range of 25-300° C., and the linear expansion coefficient of the object to be measured was calculated based on the obtained data. The result of the measurement for the shielding layer is shown in the Table 3 which will be described later. Note that the linear expansion coefficient $\alpha_{Si}$ of the SiOC layer in the Example 1 was in a range of 0.6-4.0×10⁻⁶/K.

[C/Si]

The element ratio of the SiOC layer was measured by an ESCA (Electron Spectroscopy Chemical Analysis). As the measurement apparatus, a scanning-type X-ray photoelectron spectrometer (XPS) "PHI Quantera II" (product name) manufactured by ULVAC-PHI was used. A sample having such a size that the sample can be fitted on the sample table of the measurement apparatus (i.e., several millimeter square) was cut out, and the sample was set in the measurement apparatus. The measurement conditions (analysis diameter: 100 μmφ, X-ray setting: 25 W, 15 kV, sputter setting: 2 kV (2 mm×2 mm area), vacuum level during analysis: about 2×10⁻⁷ Pa) were entered. Then, the analysis of the composition in the film was performed by repeating the measurement while shaving off a film by a sputter gun (for a film shaving purpose). The film composition in the SiOC layer was analyzed and the C/Si value was calculated by using the element ratio at the center of the SiOC layer. The calculated values are shown in the Table 3.

[Crystallinity Value]

The crystallinity of the shielding layer was calculated by XRD (X-ray Diffraction). As the measurement apparatus, a fully-automated multipurpose X-ray diffraction apparatus "Smart Lab" (product name) manufactured by Rigaku was used. A sample having such a size that the sample can be fitted on the sample table of the measurement apparatus (i.e., several millimeter square) was cut out, and the sample was set in the measurement apparatus. The measurement conditions (tube voltage 45 kV, tube current 200 mA) was entered, and the measurement was carried out by the 2θ/θ scan method with a measurement angle of 10-80 degrees, a step of 0.02 degrees, and a scanning speed of 20 degrees/minute. The crystallinity value of the shielding layer (CPS (Count Per Second) of $Bi_4(SiO_4)_3$ crystalline phase/CPS of Cu—Cr—Mn—O spinel pigment phase) was calculated by using the obtained x-axis 2θ/θ angle and y-axis CPS value. The calculated crystallinity values are shown in the Table 3. Note that the peak of the $Bi_4(SiO_4)_3$ crystalline phase is obtained at 2θ/θ: 32.6 degrees, and the peak of Cu—Cr—Mn—O spinel pigment phase is obtained at 2θ/θ: 35.8 degrees. In Examples 5 and 6 which will be described layer, crystallinity values were not measures.

[(C/Si)/Crystallinity Value]

The value expressed as "(C/Si)/Crystallinity Value" was calculated by dividing the C/Si value obtained by the above-described measurement method by the crystallinity value. The calculated values are shown in the Table 3.

Example 2

A glass substrate including a plurality of layers was manufactured in a manner similar to the Example 1 except that the conditions for firing the material for forming the shielding layer in the firing furnace were changed as shown below. Further, evaluations were made based on the above-described evaluation methods and each physical property value was measured.

—Firing Condition
 Firing temperature: 680° C.,
 Firing speed: 10 mm/s.
Note that the linear expansion coefficient $\alpha_{Si}$ of the SiOC layer in the Example 2 was in a range of 0.6-4.0×10⁻⁶/K.

Example 3

A glass substrate including a plurality of layers was manufactured in a manner similar to the Example 1 except that the below-shown conditions were changed. Further, evaluations were made based on the above-described evaluation methods and each physical property value was measured. Specifically, in the Example 3, the raw-material gas used in the film-forming conditions for the SiOC layer and the firing conditions for the material for forming the shielding layer in the firing furnace were changed as shown below.

—SiOC Layer Film-Forming Condition
 Raw material gas: silane gas (0.335 kg/hr), ethylene gas (0.64 kg/hr), carbon dioxide gas (14.11 kg/hr), and nitrogen gas (1.00 kg/hr).
—Firing Condition
 Firing temperature: 710° C.,
 Firing speed: 25 mm/s.
Note that the linear expansion coefficient $\alpha_{Si}$ of the SiOC layer in the Example 3 was in a range of 0.6-4.0×10⁻⁶/K.

Example 4

A glass substrate including a plurality of layers was manufactured in a manner similar to the Example 1 except that the raw-material gases used for the SiOC layer film-forming conditions, the first TCO layer film-forming conditions, and the second TCO layer film-forming conditions, respectively, were changed as shown below. Further, evaluations were made based on the above-described evaluation methods and each physical property value was measured.

—SiOC Layer Film-Forming Condition
 Raw material gas: silane gas (0.335 kg/hr), ethylene gas (0.64 kg/hr), carbon dioxide gas (14.11 kg/hr), and nitrogen gas (1.00 kg/hr).
—First TCO Layer Film-Forming Condition
 Raw material: MBTC raw material (50.6 L/hr), Sb raw material (6.0%), and HCl gas (9.37 kg/hr).
—Second TCO Layer Film-Forming Condition
 Raw material: MBTC raw material (17.93 L/hr), F raw material (TFA) (6.98 L/hr), oxygen gas (24.10 Nm³/hr), and nitrogen gas (20.28 Nm³/hr).

Example 5

A glass substrate including a plurality of layers was manufactured in a manner similar to the Example 1 except that the below-shown conditions were changed. Further, evaluations were made based on the above-described evaluation methods and each physical property value was measured. Note that the linear expansion coefficient $\alpha_{Si}$ of the SiOC layer in the Example 5 was in a range of 0.6-4.0×10⁻⁶/K. Specifically, in the Example 5, the material for forming the shielding layer used in the Example 1 was changed to product name: B9-71 manufactured by Ferro Corporation.

Example 6

A glass substrate including a plurality of layers was manufactured in a manner similar to the Example 1 except that the below-shown conditions were changed. Further, evaluations were made based on the above-described evaluation methods and each physical property value was measured. Specifically, in the Example 6, the raw-material gases used for the film-forming conditions of the SiOC layer were changed to a silane gas (0.335 kg/hr), an ethylene gas (0.64 kg/hr), a carbon dioxide gas (14.11 kg/hr), and a nitrogen gas (1.00 kg/hr). Further, in the Example 6, the material for forming the shielding layer used in the Example 1 was changed to product name: B9-83 manufactured by Ferro Corporation. Note that the linear expansion coefficient $\alpha_{Si}$ of the SiOC layer in the Example 6 was in a range of 0.6-4.0×$10^{-6}$/K.

The Table 3 shows the results of the measurements of the SiOC layer and the shielding layer in each of the examples, and the evaluation results based on the above-described evaluation methods.

TABLE 3

| | SiOC Layer | | | | | Shielding Layer | (C/Si)/ | Evaluation Result |
|---|---|---|---|---|---|---|---|---|
| | at % | | | at % Ratio | | | Crystallinity | Heat |
| Example | C | O | Si | C/Si | O/Si | $\alpha_{sh}$ (/K) | Crystallinity Value | Value | Resistance |
| 1 | 8.38 | 55.76 | 31.49 | 0.27 | 1.77 | $7.5 \times 10^{-3}$ | 18.3 | 0.015 | 3 |
| 2 | 8.38 | 55.76 | 31.49 | 0.27 | 1.77 | $7.5 \times 10^{-3}$ | 16.7 | 0.015 | 3 |
| 3 | 4.44 | 60.72 | 26.15 | 0.17 | 2.32 | $7.5 \times 10^{-3}$ | 14.3 | 0.009 | 4 |
| 4 | 21.89 | 40.29 | 35.41 | 0.62 | 1.14 | $7.5 \times 10^{-3}$ | 18.3 | 0.034 | 1 |
| 5 | 8.38 | 55.76 | 31.49 | 0.27 | 1.77 | $8.3 \times 10^{-3}$ | — | — | 1 |
| 6 | 4.44 | 60.72 | 26.15 | 0.17 | 2.32 | $9.5 \times 10^{-3}$ | — | — | 1 |

As shown in the above-shown Table 3, it can be understood that the present glass articles in each of which the ratio C/Si of the SiOC layer is 0.1-0.5 and the linear expansion coefficient $\alpha_{sh}$ of the shielding layer is 7.7×$10^{-3}$/K or lower exhibit excellent heat resistances. Further, the present glass articles obtained in the Examples 1 to 3 also have excellent mold-release properties.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A glass article comprising, on a glass substrate, a carbon-added silicon oxide layer, a transparent conductive oxide layer, and a shielding layer in this order, wherein
    an atomic-composition percentage ratio C/Si of carbon to silicon in the carbon-added silicon oxide layer is 0.1 or more and 0.5 or less,
    a linear expansion coefficient ash of the shielding layer is 7.7×$10^{-3}$/K or less,
    the shielding layer contains a crystalline component and a pigment, and
    a crystallinity value expressed by a Count Per Second (CPS) ratio of the crystalline component to the pigment in X-ray diffraction measurement data of the shielding layer is 7 or more and 33 or less.
2. The glass article according to claim 1, wherein
    a ratio of the C/Si of the carbon-added silicon oxide layer, to a crystallinity value expressed by a Count Per Second (CPS) ratio of the crystalline component to the pigment in X-ray diffraction measurement data of the shielding layer is 0.005 or more and 0.04 or less.
3. The glass article according to claim 1, wherein a linear expansion coefficient $\alpha_{Si}$ of the carbon-added silicon oxide layer is 0.6×$10^{-6}$/K or more and 4.0×$10^{-6}$/K or less.
4. The glass article according to claim 3, wherein the linear expansion coefficient $\alpha_{Si}$ of the carbon-added silicon oxide layer is 2.9×$10^{-6}$/K or less.
5. The glass article according to claim 1, wherein a thickness $t_g$ of the glass substrate is 2.0 mm or more and 3.5 mm or less.
6. The glass article according to claim 1, wherein a thickness $t_{Si}$ of the carbon-added silicon oxide layer is 30 nm or more and 150 nm or less.
7. The glass article according to claim 1, wherein the transparent conductive oxide layer contains at least one layer selected from the group consisting of a fluorine-doped tin oxide layer and an antimony-doped tin oxide layer.
8. The glass article according to claim 1, wherein the glass article is used as a window glass for vehicle.
9. The glass article according to claim 1, wherein an atomic-composition percentage ration O/Si of oxygen to silicon in the carbon-added silicon oxide layer is 1.2 or more and 3.0 or less.
10. The glass article according to claim 1, wherein a linear expansion coefficient $\alpha_{TCO}$ of the transparent conductive oxide layer is 1.0×$10^{-6}$/K or more and 9.0×$10^{-6}$/K or less.
11. The glass article according to claim 7, wherein a thickness of the fluorine-doped tin oxide layer is 100 nm or more and 500 nm or less, and a thickness of the antimony-doped tin oxide layer is 250 nm or more and 500 nm or less.
12. A glass article comprising, on a glass substrate, a carbon-added silicon oxide layer, a transparent conductive oxide layer, and a shielding layer in this order, wherein
    an atomic-composition percentage ratio C/Si of carbon to silicon in the carbon-added silicon oxide layer is 0.1 or more and 0.5 or less,
    a linear expansion coefficient ash of the shielding layer is 7.7×$10^{-3}$/K or less,
    the shielding layer contains a crystalline component and a pigment, and
    a ratio of the C/Si of the carbon-added silicon oxide layer, to a crystallinity value expressed by a Count Per Second (CPS) ratio of the crystalline component to the pigment in X-ray diffraction measurement data of the shielding layer is 0.005 or more and 0.04 or less.
13. The glass article according to claim 12, wherein a linear expansion coefficient $\alpha_{Si}$ of the carbon-added silicon oxide layer is 0.6×$10^{-6}$/K or more and 4.0×$10^{-6}$/K or less.
14. The glass article according to claim 13, wherein the linear expansion coefficient $\alpha_{Si}$ of the carbon-added silicon oxide layer is 2.9×$10^{-6}$/K or less.
15. The glass article according to claim 12, wherein a thickness $t_g$ of the glass substrate is 2.0 mm or more and 3.5 mm or less.
16. The glass article according to claim 12, wherein a thickness $t_{Si}$ of the carbon-added silicon oxide layer is 30 nm or more and 150 nm or less.
17. The glass article according to claim 12, wherein the transparent conductive oxide layer contains at least one layer selected from the group consisting of a fluorine-doped tin oxide layer and an antimony-doped tin oxide layer.

18. The glass article according to claim 12, wherein the glass article is used as a window glass for vehicle.

19. The glass article according to claim 12, wherein an atomic-composition percentage ration O/Si of oxygen to silicon in the carbon-added silicon oxide layer is 1.2 or more and 3.0 or less.

20. The glass article according to claim 12, wherein a linear expansion coefficient $\alpha_{TCO}$ of the transparent conductive oxide layer is $1.0 \times 10^{-6}$/K or more and $9.0 \times 10^{-6}$/K or less.

21. The glass article according to claim 17, wherein a thickness of the fluorine-doped tin oxide layer is 100 nm or more and 500 nm or less, and a thickness of the antimony-doped tin oxide layer is 250 nm or more and 500 nm or less.

* * * * *